E. S. REILAND.
TIRE AND RIM TOOL.
APPLICATION FILED JULY 6, 1918.

1,302,591.

Patented May 6, 1919.

UNITED STATES PATENT OFFICE.

ERNEST S. REILAND, OF ST. PAUL, MINNESOTA.

TIRE AND RIM TOOL.

1,302,591.  Specification of Letters Patent.  Patented May 6, 1919.

Original application filed May 10, 1918, Serial No. 233,816. Divided and this application filed July 6, 1918. Serial No. 243,711.

*To all whom it may concern:*

Be it known that I, ERNEST S. REILAND, a citizen of the United States, residing at St. Paul, in the county of Ramsey and State of Minnesota, have invented a new and useful Tire and Rim Tool, of which the following is a specification.

This invention relates to tire and rim tools, and the object is to provide a novel efficient and convenient means for so contracting the rim of a wheel that the pneumatic or other cushion tire may be placed onto or removed from the rim.

I do not claim that the device herein described is in all cases sufficient alone for said purpose, additional means may in many cases have to be employed in connection with the present device; but as such combined use of devices has been fully shown and described in my application for United States Patent, Serial No. 233,816, filed May 10, 1918, I need not here further describe the auxiliary device and its use with the present device, but have simply referred to said patent for a full disclosure.

Figure 1:
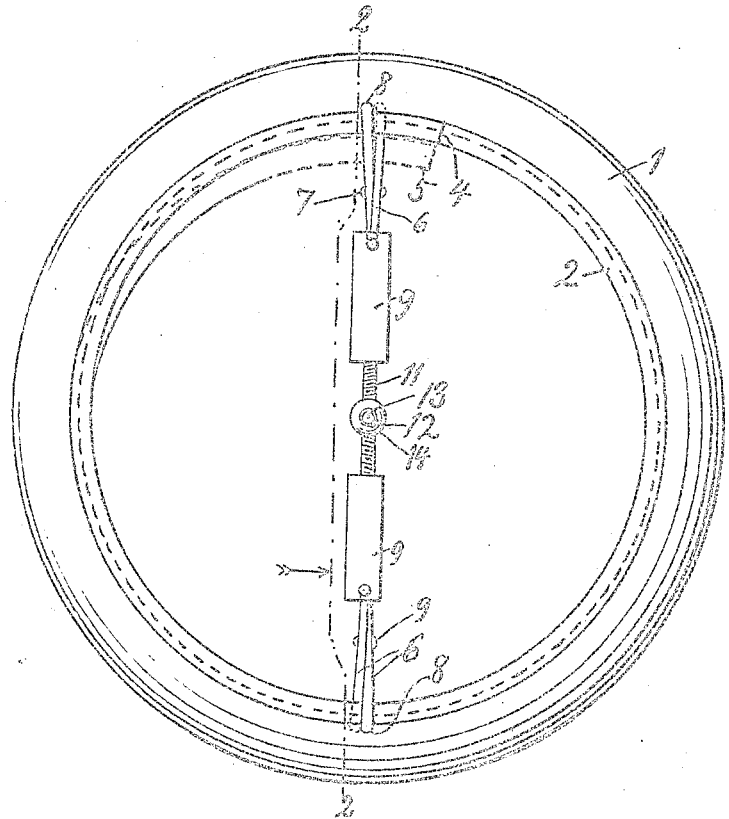
Figure 2:
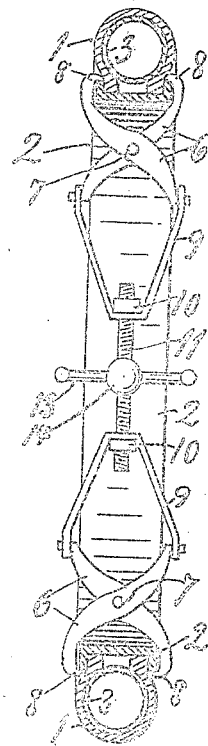

In the accompanying drawing:

Figure 1 is a side view of a pneumatic rubber tire and the rim holding it, and my device applied to said rim for crimping it inward at one of its ends. Fig. 2 is a diametrical section on the line 2—2 in Fig. 1.

Referring to the drawing by reference numerals, 1 designates a pneumatic or other rubber tire normally fitted tightly about a demountable rim 2, which is secured on the wheel (not shown) by any suitable means.

The tire may or may not be of the kind having an inner tube 3 and a casing 1, but as my invention is not dependent on the species of tire I will simply refer to the tire by the numeral 1.

The rim 2 has an open joint 4 which enables either one of its joined ends to be sprung inward as at 5 in Fig. 1, and will thereby cause slackness in the tire preparatory to separating it from the rim. To thus spring or contract the rim takes considerable force, especially if the wheel is a large one. My device for contracting the rim is therefore composed of the following parts.

Two pairs of crossed levers 6 are pivoted at 7 to form grab-hooks or grippers with angular jaws 8 adapted to grip the edges of the rim, one gripper near the joint 4 and the other diametrically opposite therefrom. To the inner ends of said levers are attached V-shaped springs or spring yokes, 9, which at all times tend to close the hooks 8 over the rim and thus keep the grippers wherever they are placed on the rim until further force can be applied to them by the following means.

Retained in and by the bend of each spring-yoke 9 is a square nut 10, one of said nuts is provided with right-hand threads the other with left hand threads, and into said nuts are threaded the opposite ends of a screw bar 11, the latter passing through apertures in the spring yokes 9 and having its middle portion 14 enlarged and provided with a hole 12 and a turn-spike 13 therein for turning the screw-bar by hand.

In the operation of the device the grippers are placed on the rim in about the position shown, the screw bar is then turned until the rim is sufficiently contracted to enable the tire to be slipped onto or off from the rim, either by hand or by the auxiliary means disclosed and claimed in my said other application.

What I claim is:

1. In a device of the class described, two pairs of crossed and at the crossings pivoted levers forming two grippers, each with angular jaws adapted to grip the rim and with hooks at the other ends of the levers, two V-shaped springs, each of which has its arms perforated and engaged one with each of the hooks so as to normally tend to close the grippers; a screw engaged with the bends of the springs to pull them toward the center of the rim.

2. The structure specified in claim 1, said screw connection comprising two nuts one retained in and by the bend of each spring and provided one with right-hand threads the other with left-hand threads, and the screw having its opposite ends threaded to fit in said nuts, and at its middle means by which to rotate the screw; said springs having each an aperture for the screw-bar to pass through and reach the nut.

In testimony whereof I affix my signature.

ERNEST S. REILAND.